G. W. BRETZ.
ATTACHMENT FOR CAMERAS.
APPLICATION FILED APR. 13, 1916.
1,225,757.
Patented May 15, 1917.
2 SHEETS—SHEET 1.
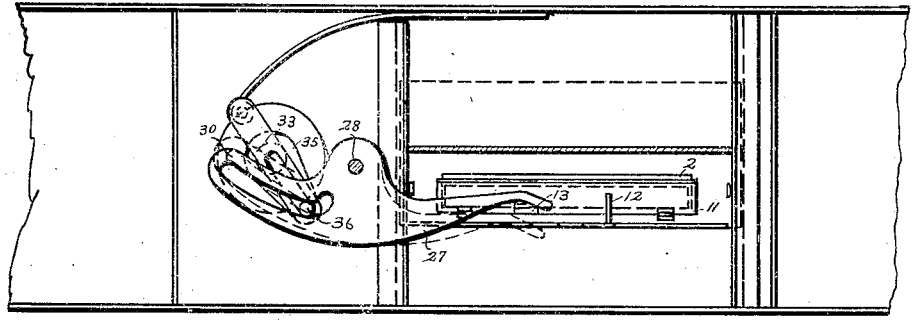
Fig. 2.
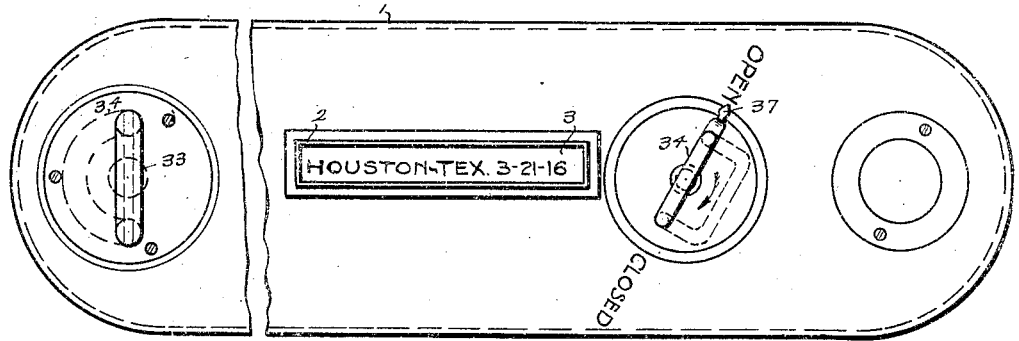
Fig. 1.
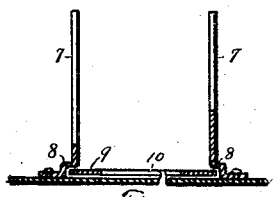
Fig. 8.
Fig. 9.
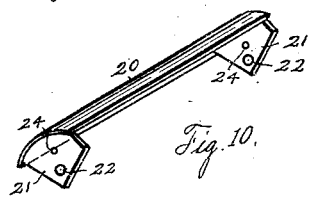
Fig. 10.
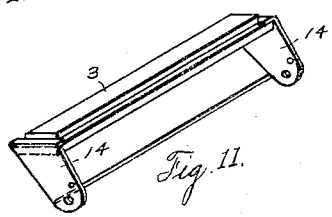
Fig. 11.
INVENTOR
George W Bretz
BY
Hardway Cathey
ATTORNEYS

G. W. BRETZ.
ATTACHMENT FOR CAMERAS.
APPLICATION FILED APR. 13, 1916.

1,225,757.

Patented May 15, 1917.
2 SHEETS—SHEET 2.

INVENTOR
George W. Bretz

BY
Hardway Cather
ATTORNEYS.

UNITED STATES PATENT OFFICE.

GEORGE W. BRETZ, OF HOUSTON, TEXAS, ASSIGNOR OF THREE-FIFTEENTHS TO CLAUD A. LOWRY, OSCAR O. WOOD, J. H. WADE, AND P. R. PIRTLE, ONE-FIFTEENTH TO F. E. JONES, ONE-FIFTEENTH TO S. H. GRIPP, AND ONE-FIFTEENTH TO L. C. IRONS, ALL OF HOUSTON, TEXAS.

ATTACHMENT FOR CAMERAS.

1,225,757.  Specification of Letters Patent.  Patented May 15, 1917.

Application filed April 13, 1916. Serial No. 90,639.

*To all whom it may concern:*

Be it known that I, GEORGE W. BRETZ, a citizen of the United States, residing at Houston, in the county of Harris and State of Texas, have invented certain new and useful Improvements in Attachments for Cameras, of which the following is a specification.

This invention relates to a new and useful improvement in an attachment for cameras and pertains more particularly to an attachment provided for the purpose of forming legends or titles on the films by a photographic process.

Another feature of the invention resides in the provision of means for positively excluding light from the film, excepting at the instant when the process of photographing said legend or title takes place and of admitting the light at the desired time.

With the above and other objects in view the invention has particular relation to certain novel features of construction, operation and arrangement of parts, an example of which is given in this specification and illustrated in the accompanying drawings, wherein:—

Figure 1 shows a side elevation of a camera,

Fig. 2 shows a similar view thereof with the near wall removed,

Figure 3:
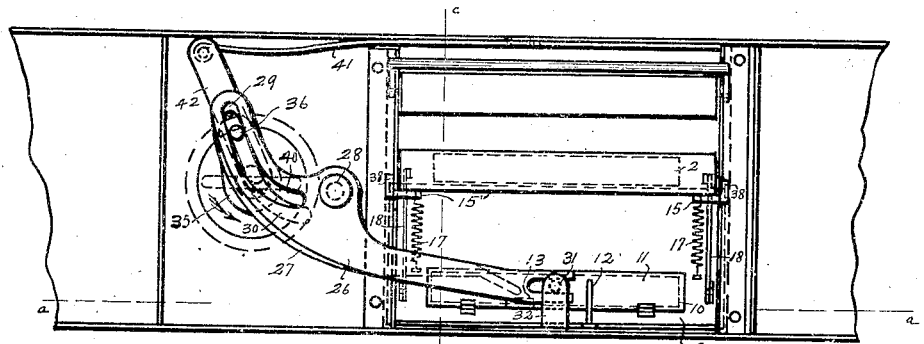
Figure 4:
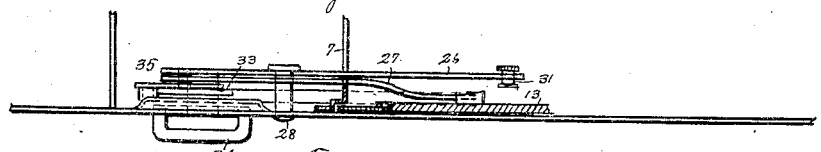
Figure 5:
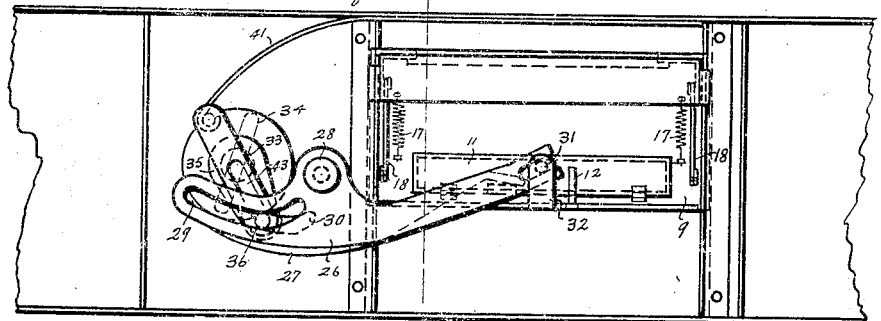
Figure 6:
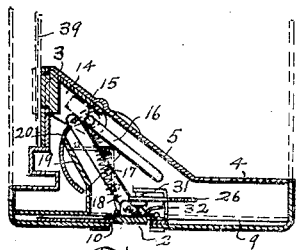
Figure 7:
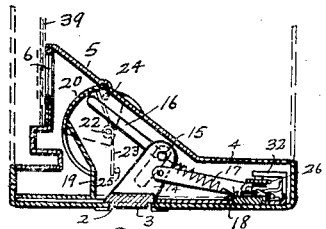

Fig. 3 shows a fragmentary plan view of a camera showing the attachment in position for receiving the title or legend, Fig. 4 shows a longitudinal sectional view thereof taken on the line a—a of Fig. 3, Fig. 5 shows a fragmentary plan view of the camera showing the positions the parts will assume when the title or legend is in position to be photographed upon the film, Fig. 6 is a transverse sectional view taken on the line b—b of Fig. 5, Fig. 7 is a transverse sectional view taken on the line c—c of Fig. 3, Figs. 8 and 9 show fragmentary transverse sectional and plan views, respectively, of parts of the camera casing, Fig. 10 shows an isometric view of a shutter employed, and Fig. 11 shows an isometric view of the title receiving member.

Referring now more particularly to the drawings, wherein like numerals of reference designate similar parts, in each of the figures the numeral 1 refers to the camera, which is of any well known form and which has the window 2 through the wall thereof, for the double purpose of exposing the title receiving member 3 and of admitting light for photographing the title on the film at the proper time. This complete attachment is carried by the camera wall and is inclosed by means of a plate 4, the middle part of which is formed into an inclosing hood 5 having an oblong opening 6 therethrough for a purpose to be hereinafter stated. Upstanding plates 7, 7 are provided and formed, with respect to the bottom thereof, so as to provide receiving grooves 8, 8 in which the shutter plate 9 slides. This plate is provided with an oblong window 10, which is cut therethrough and has also the shutter 11 hinged to the plate and normally closing said window. The shutter is held in closed position by means of the flat spring 12, one end of which is anchored to the plate 9 and the free end of which rests against said shutter and the hinged edge of the shutter has an upstanding stud 13 fixed thereto, the purpose of which will hereinafter be described.

The title receiving member 3 is provided at its ends with the arms 14, 14 which have bearing pins 15 15 projecting through alined slots, as 16, in the respective plates 7 and provide sliding bearings for said title receiving member and pull springs 17, 17 are provided whose ends are attached, respectively, to the plate 9 and pins 15, 15. A pair of links 18, 18 are provided, each of which is pivoted at one end to the plate 9, and at the other end to the corresponding arm 14 between its bearing and the member 3.

Behind the opening 2 and extending from end to end of the hood 5 is an apron 19, the upper edge thereof falling short of the top of the hood to provide a light window which is normally closed by means of the oblong shutter 20, arcuate in cross section. This shutter has the end bearings 21, 21, which are pivoted to the plates 7, 7, by means of bearing pins 22, 22, and it is normally held in closed position by means of springs as 23, which are coiled around the respective pins 22 and whose ends are free and press against the respective studs 24 and 25, which project from the adjacent plates 7 and the corresponding bearings 21, respectively.

Two arcuate levers 26 and 27 are pivoted on the pin 28, the former being above the latter. These levers have arcuate slots 29 and 30, respectively, through one end and the other end of the lever 26 is bifurcated, the fingers thereof embracing the pin 31 which depends from the finger 32 upstanding from the plate 9, while the other end of the lever 27 projects behind the stud 13 and when manipulated contacts with said stud to open the shutter 11.

A short shaft 33 has a bearing in the camera wall and its outer end has the thumb grip 34. Fixed to the inner end of this shaft is the cam 35, whose free end carries the pin 36, which projects through the slots 30 and 29.

The member 3 is formed of ground glass and the title or legend which it is desired to transfer to the film may be written thereon with the ordinary pencil or other similar means when the member is projected through the window 2, as shown in Figs. 1 and 7. Assuming this member is in the position shown in Fig. 7, the mechanism will occupy the position shown in Fig. 3 and the indicator 37, shown in Fig. 1, will indicate open position. The thumb grip 34 may then be turned in the direction indicated by the arrow in Figs. 1 and 3 and the pin 36 moving through the slot 29 of the lever 26 will manipulate said lever, moving the plate 9 laterally and carrying the shutter 11 toward said window 2. While this movement is taking place the links 18, 18 will operate against the corresponding arms 14, 14 and simultaneously therewith the pull springs 17, 17 will operate to hold the bearing pins 15, 15 against the lower ends of the slots 16, causing the member 3 to be withdrawn from the window and to swing around on said bearing pins. Meanwhile, the shutter 20 remains closed until the fingers 38, 38, carried by the outer ends of the pins 15, 15, contact against the end bearings 21, 21 of the shutter 20 and force said shutter open. Before this shutter is opened, however, the plate 9 has closed the window 2, excluding all light and as the movement of said plate continues the member 3 passes through the light window, which has been opened by the shutter 20, and is projected through the opening 6 and rests against the film 39, as shown in Fig. 6. The slot 30 is eccentric with respect to the slot 29, forming in effect, a cam 40, carried by the lever 27 and when the member is seated against the film the pin 36 contacts against this cam 40, forcing the opposite end of the lever 27 outwardly against the stud 13 and opening the shutter 11 for an instant, the free end of the lever 27 passing over said stud into the position shown in dotted lines in Fig. 2 and the spring 12 then suddenly closing the shutter, thus admitting light through the window 2, and the shutter 20 at this time being open, the title or legend on the member 3 is photographed onto the film. For the purpose of restoring the mechanism to its original position a flat spring 41 is secured to the camera wall at one end and its other end is pivoted to the link 42, which has a slot 43 through which the pin 36 also projects. The tension of the spring 41 is overcome when the thumb grip is turned, as hereinbefore indicated, the mechanism assuming the position shown in Fig. 5. When the thumb grip is released this spring 41, operating through the link 42, carries the levers 26 and 27 back into intermediate position, withdrawing the member 3 back within the hood so as to clear the shutter 20 and releasing the fingers 38 from the bearings 21 with the result that the shutter 20 is released to the influence of the spring 23, and the shutter 20 thus closed. When in this position, the plate 9 will not be withdrawn far enough to clear the window 2 and said plate and shutter 20 will form a double protection against the admission of light. When it is desired to again expose the title member 3, the thumb grip 34 may be manually turned to open position shown in Fig. 1 and the desired result will thus be accomplished.

It will be observed that the member 3 after it has received the legend or title, turns on its bearings and is in reversed position when it bears against the film, causing said title to photograph on the film the reverse of position it is written on said member. This movement is essential inasmuch as the film images are reversed in finishing the final picture.

What I claim is:

1. The combination with a photographing machine having an opening through the wall thereof, of a translucent member arranged to be exposed through said opening, means excluding light admitted through said member when in its exposed position, a mechanism connected to said member for withdrawing the same from said opening and seating the same against the camera film, a shutter normally closing said opening after the translucent member is withdrawn therefrom, said mechanism also engaging against said shutter to open the same after said member has seated against the film.

2. The combination with a photographing machine having an opening through the wall thereof, of a translucent member arranged to be exposed through said opening, a movable light excluding shutter arranged behind said member when in exposed position, a mechanism connected to said member for withdrawing the same and seating it against the film, a slidable plate closing said opening after the withdrawal of said member, a shutter carried by the plate which alines with the opening when the member is seated against the film and means for temporarily opening said shutter.

3. The combination with a photographing machine having an opening through the wall thereof and provided with a film, of a translucent member arranged to be exposed through said opening, a movable opaque member arranged behind the translucid member when in exposed position, a manually operated mechanism connected to said member for withdrawing the same from the opening and seating it against said film, a slidable plate having an opening therethrough, a shutter normally closing said opening, said plate normally closing the opening in the wall of the machine after the withdrawal of said translucent member and means for temporarily opening said shutter while said translucent member is in contact with said film.

4. The combination with a photographing machine having an opening through the wall thereof and provided with a film, of translucent member arranged to be exposed through said opening, a shutter normally in closed position between said opening, film and a mechanism connected to said member for withdrawing the same from said opening, and seating it against the film, said mechanism actuating the shutter to withdraw the same from the path of said member as it moves from said opening into position against the film, and means closing said opening immediately after said member is withdrawn therefrom.

5. The combination with a photographing machine having an opening through the wall thereof and provided with a film, of a translucent member arranged to be exposed through said opening, a shutter normally in closed position between said opening and film to exclude the light from the latter, a slidable plate closing said opening when said member is withdrawn therefrom, a mechanism actuating said member and plate and withdrawing the former from said opening and seating it against the film, a shutter carried by the plate which alines with the opening, and is temporarily opened by said mechanism when said member is seated against the film.

6. The combination with a photographing machine having an opening in the wall thereof and provided with a film, of a pivotally mounted translucent member arranged to be exposed through said opening, means excluding light from the film when said member is in exposed position, a slidable plate having an opening therethrough, a shutter normally closing the plate opening, an operative connection between said plate and translucent member, a mechanism for actuating the plate whereby said member is, by said connection, withdrawn from said opening and seated against said film and said plate is moved over the wall opening until the plate opening registers therewith, said means then temporarily opening said shutter to admit light through said openings.

7. The combination with a photographing machine having an opening through the wall thereof and provided with a film, of a pivotally mounted translucent member arranged to be exposed through said opening, a shutter between said opening and film normally closed to exclude the light from the film, a slidable plate having an opening, a shutter normally closing the same, an operative connection between said plate and member, a mechanism for actuating said plate and said member whereby said member is withdrawn from said opening and seated against said film, and said plate is moved over the wall opening until the plate opening registers therewith, and means then temporarily opening said last mentioned shutter.

8. The combination with a photographing apparatus having an opening through the casing wall and provided with a film, of a data receiving member, a mechanism for alternatively projecting said member into said opening and against said film, a shutter arranged to exclude the light from said film while said member is exposed through said opening, a shutter arranged to normally close said opening when said member is seated against the film, shutter actuating means whereby the first mentioned shutter is withdrawn from the path of said member during its movement from exposed position to position against said film and whereby the last mentioned shutter is actuated to admit light temporarily while said member is seated against the film.

9. The combination with a photographing apparatus having an opening through the casing wall and provided with a film, of an inscription receiving member pivotally mounted, a mechanism for projecting said member into said opening to receive the inscription and then reversing the same and projecting it into printing relation with the film, means for excluding light from the film when said member is in inscription receiving position, and controllable means whereby light may be admitted through said member to light print its inscription on said film.

10. The combination with a photographing machine having an opening through the wall thereof, of a ground glass member arranged to be exposed through said opening, a light excluding means arranged behind said member when in exposed position, a mechanism connected with said member for withdrawing the same from said opening and seating the same against the film, means normally closing said opening after the ground glass member is withdrawn therefrom to exclude light from the film, said mechanism also engaging against said means to open the same after said member has seated against the film.

11. A casing having a controllable exposure opening and within which casing a sensitized photographic element may be protected from light and held in position for exposure, a translucid member through which light may be transmitted to print upon a sensitized element thus positioned, said member having a surface accessible from the exterior of the casing without admitting light to the interior thereof, said surface being adapted to receive an inscription differing in light transmitting properties from the remainder of said surface, a mechanism whereby said member may be projected into said opening or against said film, alternatively, and controllable means whereby light may be admitted through said inscribed member to light print its inscription on said sensitized element.

12. A casing having a controllable exposure opening, and within which casing a sensitized photographic element which may be protected from light and held in position for exposure, a translucid member through which light may be transmitted to print upon said sensitized element said member having a surface accessible from the exterior of the casing without admitting light to the interior thereof, said surface being adapted to receive an inscription differing in light transmitting properties from the remainder of said surface, a mechanism whereby said member may be projected into said opening and into printing relation with said film alternatively or controllable means whereby light may be admitted through said inscribed member to light print its inscription on said sensitized element.

13. A casing having a controllable exposure opening, within which casing a sensitized photographic element may be protected from light and held in position from exposure, a ground glass inscription receiving member arranged to be exposed through said opening and having a surface adapted to receive an inscription differing in light transmitting properties from the remainder of the surface, a light excluding means arranged to exclude light from the sensitized element when said ground glass member is exposed through said opening, a mechanism connected to said member for withdrawing the same from its exposed position and reversing it and bringing it into printing relation with said sensitized element, and controllable means whereby light may be admitted through said inscribed member to light print its inscription on said sensitized element.

In testimony whereof I have signed my name to this specification in the presence of two subscribing witnesses.

GEORGE W. BRETZ.

Witnesses:
E. T. CHEW,
L. C. IRONS.

Copies of this patent may be obtained for five cents each, by addressing the "Commissioner of Patents, Washington, D. C."